US008345859B2

(12) United States Patent
Heidari et al.

(10) Patent No.: US 8,345,859 B2
(45) Date of Patent: Jan. 1, 2013

(54) METHOD AND APPARATUS FOR DSL LINE CARD POWER MANAGEMENT

(75) Inventors: Sam Heidari, Menlo Park, CA (US); Sigurd Schelstraete, Menlo Park, CA (US); Aner Tennen, Sunnyvale, CA (US); Elango Pakriswamy, San Jose, CA (US); Chun-Sup Kim, San Jose, CA (US); Luiz Felipe Fuks, Fremont, CA (US)

(73) Assignee: Ikanos Communications, Inc., Fremont, CA (US)

( * ) Notice: Subject to any disclaimer, the term of this patent is extended or adjusted under 35 U.S.C. 154(b) by 1387 days.

(21) Appl. No.: 12/009,196

(22) Filed: Jan. 16, 2008

(65) Prior Publication Data
US 2008/0170609 A1   Jul. 17, 2008

Related U.S. Application Data

(60) Provisional application No. 60/880,625, filed on Jan. 16, 2007.

(51) Int. Cl.
*H04M 1/00* (2006.01)
*H04M 9/00* (2006.01)
*H04M 7/00* (2006.01)

(52) U.S. Cl. .......................... 379/401; 379/340; 379/413

(58) Field of Classification Search .................. 379/413, 379/413.01, 318, 322–324
See application file for complete search history.

(56) References Cited

U.S. PATENT DOCUMENTS

| 5,956,323 | A  | * | 9/1999  | Bowie ........................... 370/241 |
| 6,351,534 | B1 | * | 2/2002  | Phillips ......................... 379/413 |
| 6,466,088 | B1 | * | 10/2002 | Rezvani et al. .................. 330/51 |
| 6,512,817 | B1 | * | 1/2003  | Dale et al. .................... 379/9.05 |
| 6,647,117 | B1 | * | 11/2003 | Wallace et al. ............... 379/413 |
| 6,856,597 | B1 |   | 2/2005  | Scott |
| 2003/0117963 | A1 | * | 6/2003 | Wang ............................ 370/252 |
| 2004/0120512 | A1 |   | 6/2004 | Ploumen et al. |
| 2005/0147236 | A1 | * | 7/2005 | Mills ............................. 379/413 |
| 2008/0059821 | A1 | * | 3/2008 | Xiao ............................. 713/320 |

* cited by examiner

*Primary Examiner* — Fan Tsang
*Assistant Examiner* — Jeffrey Lytle
(74) *Attorney, Agent, or Firm* — Mark J. Danielson; Pillsbury Winthrop Shaw Pittman LLP (57) ABSTRACT

A XDSL line card including an allocator for allocating power to the multi-tone modulated communications on each of the subscriber lines, and for selecting control parameters sufficient to effect communications on each of the subscriber lines at a power level proximate to an allocated power level therefore. The line card also includes configurable components coupled to one another to form a transmit path and a receive path to couple to the digital subscriber lines. The configurable components are responsive to the control parameters selected by the allocator to initialize multi-tone communications over each of the plurality of subscriber lines at a power level proximate the allocated power level.

29 Claims, 7 Drawing Sheets

Global Power Allocation Table

400

| Total Power = 5,000Watts ||||||||
|---|---|---|---|---|---|---|---|---|
| LineCard | Line | Protocol | Loop | Service ||  TxRx Control Parameters | Power ||
|  |  |  |  | Level/QOS | Type |  | Budget | Actual |
| 00A | 001 | ADSL | 18,000' | 7 Mbps | Web | ..... | 2.4W | 2.5W |
| 00A | 002 | VDSL2 | 8,000' | 100Mbps | Video | ..... | 3.0W | 2.0W |
| 00A | 003 | ......... | ........ | ............ | ........ | ...... | ......... | ......... |
| ...... | ..... | ......... | ........ | ............ | ........ | ...... | ......... | ......... |
| 00B | 963 | ADSL | 12,000' | 2 Mbps | Web | ....... | 2.4W |  |
| ...... | ..... | ......... | ........ | ............ | ........ | ...... | ......... |  |
|  |  |  |  |  |  |  | 4,000 Watts | 3,000 Watts |

Global Power Allocation Table

420

| Total Power = 5,000Watts ||||
|---|---|---|---|
|  |  | Power ||
| LineCard | #Loops | Budgeted | Actual |
| 00A | 64 | 150W | 120W |
| 00B | 48 | 120W | 110W |
| 00C | .... | .......... | .......... |
| ...... | .... | .......... | .......... |
| 0AB | 64 | 120W | 110W |
| 0AC | 48 | 120W | 110W |
|  |  | 4,000 Watts | 3,000 Watts |

FIG. 4B

Local Power Allocation Table

500

| | | | Service | | TxRx Control Parameters | Power | |
|---|---|---|---|---|---|---|---|
| Line | Protocol | Loop | Level/QOS | Type | | Budgeted | Actual |
| Total Power = 450Watts | | | | | | | |
| 001 | ADSL | 18,000' | 7 Mbps | Web | ..... | 2.4W | 2.5W |
| 002 | VDSL2 | 8,000' | 100Mbps | Video | ..... | 3.0W | 2.0W |
| ..... | ........ | ........ | ............ | ........ | ..... | .......... | .......... |
| | | | | | | 450 Watts | 300 Watts |

FIG. 5A

Power Optimization Table

510

| | Power Consumption | Data Rate Kbps/mWatt | |
|---|---|---|---|
| | | Theoretical | Actual |
| Clock Data | 10 mW/Mip | + 100 | |
| Clock Process | 2 mW/Mip | + 0 | |
| Sampling Rate | 10 mW/MHz | + 80 | |
| FFT Size | 10 mW/Tone | + 5 | |
| CodeWord Size | 10 mW/Byte | + 1 | |
| PSD Mask A | 9 mW | +1000 | |
| PSD Mask B | 20 mW | + 800 | |
| BandPlan A | 25 mW | + 2000 | |
| BandPlan B | 35 mW | +1900 | |

FIG. 5B

Setup Table

520

| | Parameters | | |
|---|---|---|---|
| Clock Data | 20 Mip | | |
| Clock Process | 10 Mip | | |
| | Line 001 | Line 002 | Line .... |
| Sampling Rate | 20 MHz | 20 MHz | 20 MHz |
| FFT Size | 512 | 1024 | 512 |
| CodeWord Size | 64 | 64 | 128 |
| PSD Mask A | True | True | True |
| PSD Mask B | False | False | False |
| BandPlan A | True | True | True |
| BandPlan B | False | False | False |

FIG. 5C

ALLOCATOR   FIG. 6

OPTIMIZER      FIG. 7

METHOD AND APPARATUS FOR DSL LINE CARD POWER MANAGEMENT

CROSS REFERENCE TO RELATED APPLICATION

This application claims the benefit of prior filed Provisional Application No. 60/880,625 filed on Jan. 16, 2007 entitled "Line Card Power Management" which is incorporated herein by reference in its entirety as if fully set forth herein.

BACKGROUND OF THE INVENTION

1. Field of Invention

The field of the present invention relates to multi-tone transceivers.

2. Description of the Related Art

In a digital multi-tone (DMT) based digital subscriber line (DSL) systems (such as ADSL, ADSL2, ADSL2+, VDSL1, VDSL2), the central office (CO) of the telephone company typically includes racks of line cards each servicing many subscriber lines. Each line card includes many chips handling the digital and analog portions of communications over the subscriber lines. The power consumption will scale with the number of subscriber lines or ports which the line card is driving. What is needed is a method for reducing power consumption in XDSL line cards.

SUMMARY OF THE INVENTION

A method and apparatus for power management of one or more XDSL line cards is disclosed. Each line card is configured to couple to many digital subscriber lines to support multi-tone modulation of communications channels thereon. In an embodiment of the invention a line card is disclosed which includes an allocator for allocating power to the multi-tone modulated communications on each of the subscriber lines and for selecting control parameters sufficient to effect communications on each of the plurality of subscriber lines at a power level proximate to an allocated power level thereto. The line card also includes configurable components coupled to one another to form a transmit path and a receive path to couple to the digital subscriber lines. The configurable components are responsive to the control parameters selected by the allocator to initialize multi-tone communications over each of the subscriber lines at a power level proximate the allocated power level.

In an alternate embodiment of the invention a line card power management system for line cards configured to couple to digital subscriber lines to support multi-tone modulation of communications channels thereon is disclosed. The line card power management system includes an allocator and at least one line card having a plurality of configurable components. The allocator allocates power to the multi-tone modulated communications of the digital subscriber lines, and selects control parameters sufficient to effect communications on each of the digital subscriber lines at a power level proximate to an allocated power level therefore. The at least one line card is coupled to the allocator and includes a plurality of configurable components coupled to one another to form a transmit path and a receive path configured to couple to associated ones of the digital subscriber lines. The plurality of configurable components are responsive to the control parameters selected by the allocator to initialize multi-tone communications over each of the associated ones of digital subscriber lines at a power level proximate the allocated power level.

In an alternate embodiment of the invention a method for power management of at least one line card configured to support multi-tone communications over digital subscriber lines is also disclosed. The method comprises:

identifying a number of digital subscriber lines coupled to the at least one line card;

determining a total power available to the at least one line card for communications over the digital subscriber lines identified in the identifying act;

allocating power to the at least one line card based at least on a number of digital subscriber lines coupled thereto; and initializing each subscriber line at a power level allocated in the allocating act.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

A method and apparatus for power management of one or more XDSL line cards is disclosed. The line cards may be found in a central office, remote access terminal, business or home. The line cards may be coupled directly or indirectly to digital subscriber lines via one or more optical or wireless links. The line cards support communication channels with differing degrees of robustness for multi-tone protocols including: asymmetric digital subscriber line (ADSL); very high bit rate digital subscriber line (VDSL) and other orthogonal frequency division multiplexing (OFDM) plans including but not limited to the following:

TABLE 1

| Standard name | Common name | Downstream rate | Upstream rate |
|---|---|---|---|
| ANSI T1.413-1998 Issue 2 | ADSL | 8 Mbit/s | 1.0 Mbit/s |
| ITU G.992.1 | ADSL (G.DMT) | 8 Mbit/s | 1.0 Mbit/s |
| ITU G.992.1 Annex A | ADSL over POTS | 8 Mbit/s | 1.0 MBit/s |
| ITU G.992.1 Annex B | ADSL over ISDN | 8 Mbit/s | 1.0 MBit/s |
| ITU G.992.2 | ADSL Lite (G.Lite) | 1.5 Mbit/s | 0.5 Mbit/s |
| ITU G.992.3/4 | ADSL2 | 12 Mbit/s | 1.0 Mbit/s |
| ITU G.992.3/4 Annex J | ADSL2 | 12 Mbit/s | 3.5 Mbit/s |
| ITU G.992.3/4 Annex L | RE-ADSL2 | 5 Mbit/s | 0.8 Mbit/s |
| ITU G.992.5 | ADSL2+ | 24 Mbit/s | 1.0 Mbit/s |
| ITU G.992.5 Annex L[1] | RE-ADSL2+ | 24 Mbit/s | 1.0 Mbit/s |
| ITU G.992.5 Annex M | ADSL2+M | 24 Mbit/s | 3.5 Mbit/s |
| ITU G.993.1 | VDSL | | |
| ITU G.993.2 | VDSL 2 | | |
| IEEE 802.16e | WiMax | | |
| IEEE 802.20 | Mobile Broadband Wireless Access | 1 Mbit/s | 1 Mbit/s |

Figure 1:
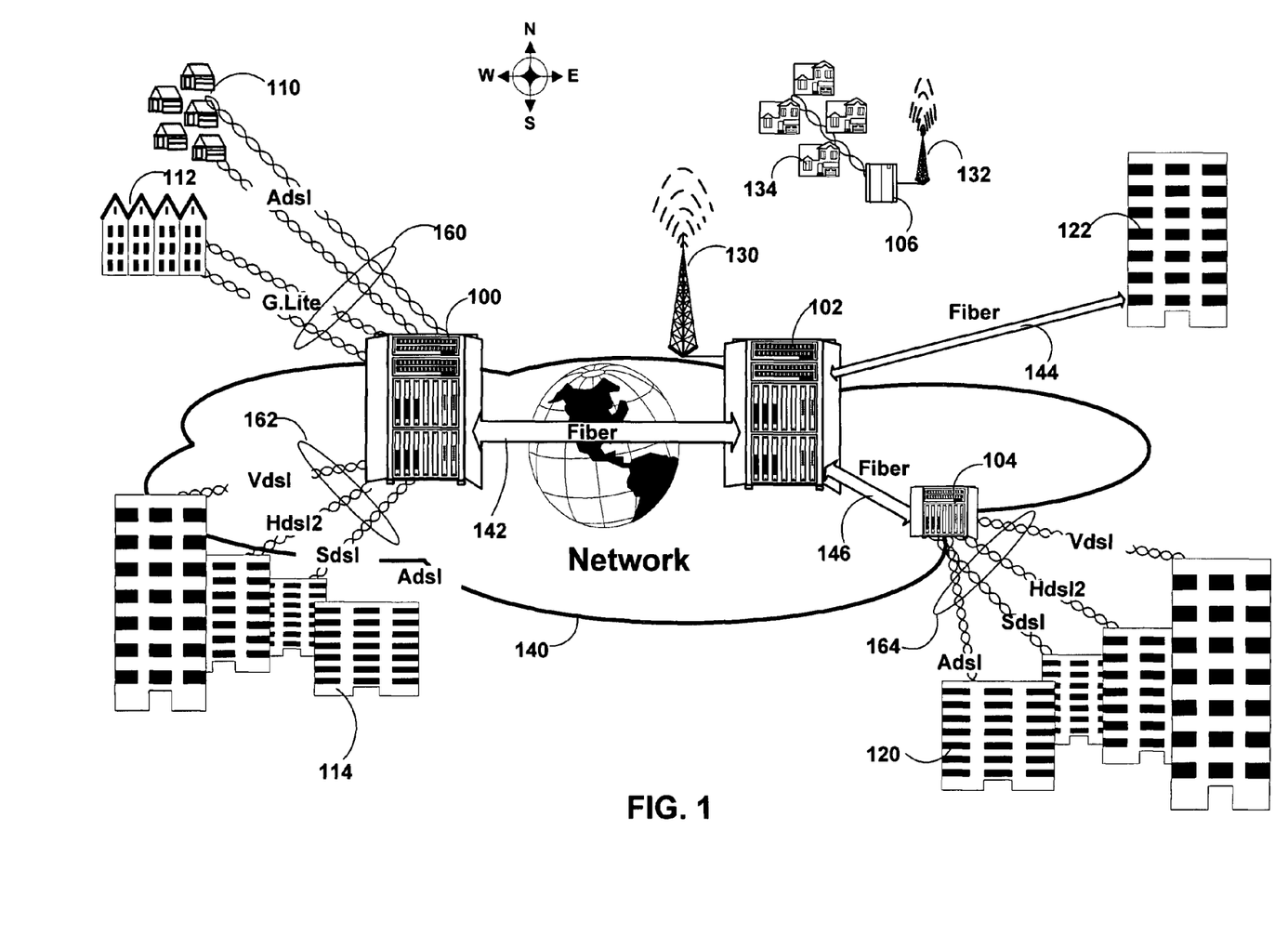
FIG. 1 is a system diagram of an XDSL communication system servicing homes and businesses from a central office.

FIG. 1 is a system diagram of an XDSL communication system in which individual subscribers are coupled across public service telephone network (PSTN) subscriber lines with one or more high speed networks. Telephone company's central offices (CO) 100, 102, 106 and remote access terminal 104 are shown coupling various subscribers to one another and to a high speed network 140. The high speed network 140 provides fiber optic links between the central office and remote access terminal. CO's 100-102 are coupled to one another via fiber optic link 142. CO 102 couples to remote access terminal 104 via fiber optic link 146. CO also couples to subscriber site 122 via fiber optic link 144. CO 102 and CO 106 couple to one another via a wireless link provided by corresponding wireless transceivers 130 and 132 respectively. The "last mile" connecting each subscriber, (except subscriber 122) is provided by twisted copper PSTN telephone lines. On these subscriber lines voice band and data communication are provided. The data communication is shown as various X-DSL protocols including G.Lite, ADSL VDSL, and HDSL2. CO 100 is coupled via G.Lite and ADSL modulated subscriber line connections 160 with subscribers 110 and 112. CO 100 is also coupled via G.Lite and ADSL modulated subscriber line connections 162 with subscriber 114. CO 106 is also coupled via a subscriber line to subscriber 134. Remote access terminal is coupled via subscriber line connections 164 with subscribers 120. In each CO or remote access terminal one or more line cards including power allocation features in accordance with the current invention may advantageously be provided with the added benefit of decreased power consumption and an increased port count. The apparatus and method of the current invention is suitable for handling power allocation and optimization on any of these subscriber lines.

Figure 2:
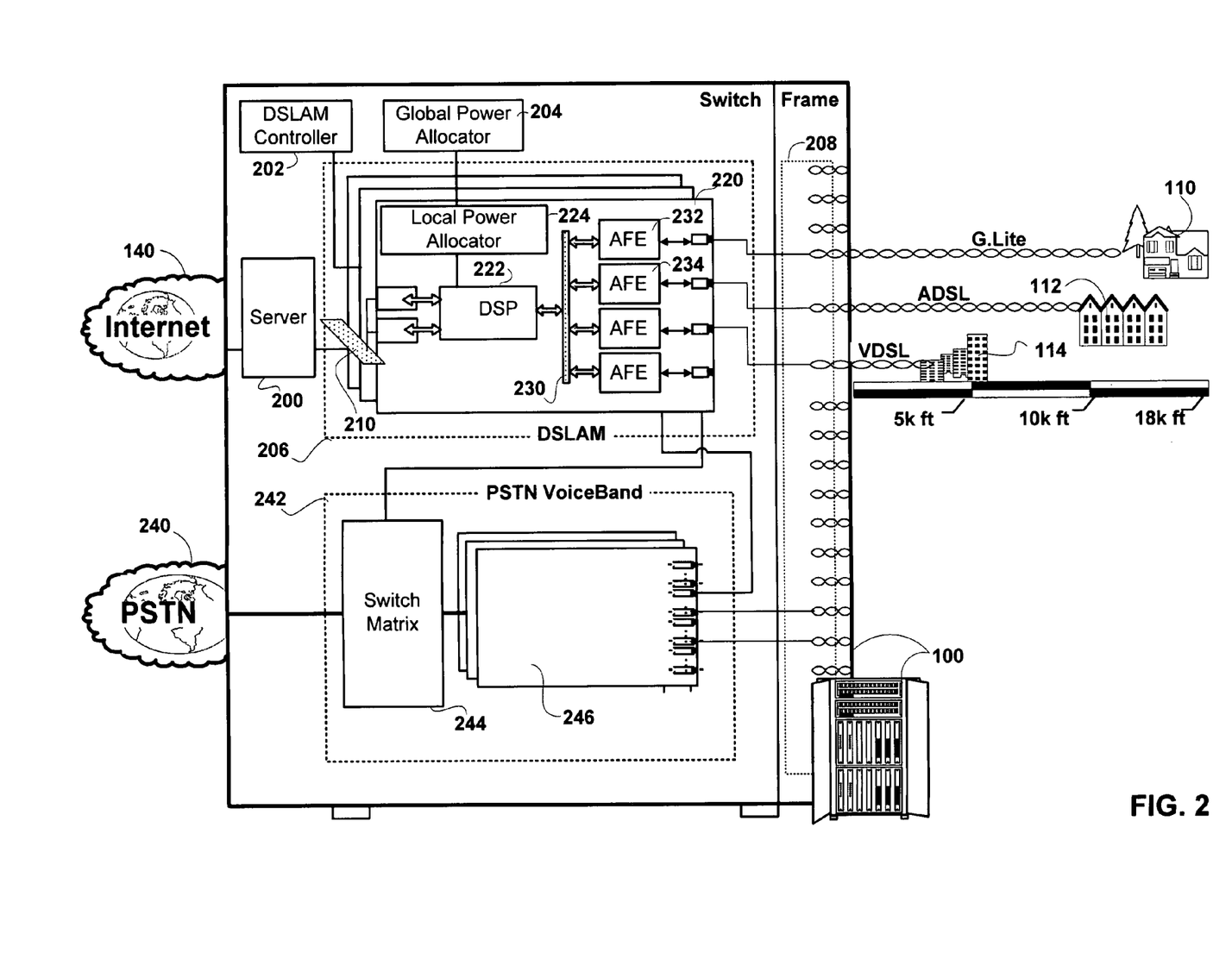
FIG. 2 is a hardware block diagram showing an embodiment of the line cards of the current invention in the central office shown in FIG. 1.

FIG. 2 is a hardware block diagram showing an embodiment of the line cards of the current invention in a representative one of the central offices shown in FIG. 1 including both digital subscriber line access modules (DSLAMs) and PSTN voice band modules. The CO 100 includes subscriber line connections to subscribers 110-114. Each of these connections terminates in the frame room 208 of the CO. From this room connections are made for each subscriber line via splitters and hybrids to both a DSLAM 206 and to the voice band racks 242. The splitter shunts voice band communications to dedicated line cards, e.g. line card 220 or to a voice band modem pool (not shown). The splitter shunts higher frequency X-DSL communications on the subscriber line to a selected line card 220 within DSLAM 206. The line cards of the current invention are universal, meaning they can handle any current or evolving standard of X-DSL and may be upgraded on the fly to handle new standards.

Voice band call set up between subscribers on the public switched telephone network (PSTN) 240 is controlled by a Telco switch matrix 244 implementing a switching protocol such as the common channel signaling system 7 (SS7) for setting up and tearing down a connection via an associated one of the voice band line cards, e.g. line card 246. This makes point-to-point connections to other subscribers for voice band communications. The X-DSL communications may be processed by a universal line card such as line card 220. That line card includes a plurality of AFE's e.g. 232-234 each capable of supporting a plurality of subscriber lines. The AFEs may be coupled directly or as in this embodiment of the invention via a packet based bus 230 to a DSP 222 which is also capable of multi-protocol support for all subscriber lines to which the AFE's are coupled. The line card may include more than one DSP. Power allocation between line cards and among the subscriber lines to which each line card is coupled is handled by a global power allocator 204 and optional local power allocators, e.g. local power allocator 224, on each line card. The line card itself is coupled to a back-plane bus 210 which may in an embodiment of the invention be capable of offloading and transporting low latency X-DSL traffic between other DSPs for load balancing. Communications between AFE's and DSP(s) are in an embodiment of the invention packet based which allows a distributed architecture such as will be set forth in the following FIG. 3 to be implemented. Each of the DSLAM line cards operates under the control of a DSLAM controller 202 which handles global provisioning, e.g. allocation of subscriber lines to AFE and DSP resources. Once an X-DSL connection is established between the subscriber and a selected one of the DSLAM sub modules, e.g. AFE and DSP, the subscriber will be able to access any network, e.g. the Internet 140, to which the DSLAM is connected.

Figure 3:
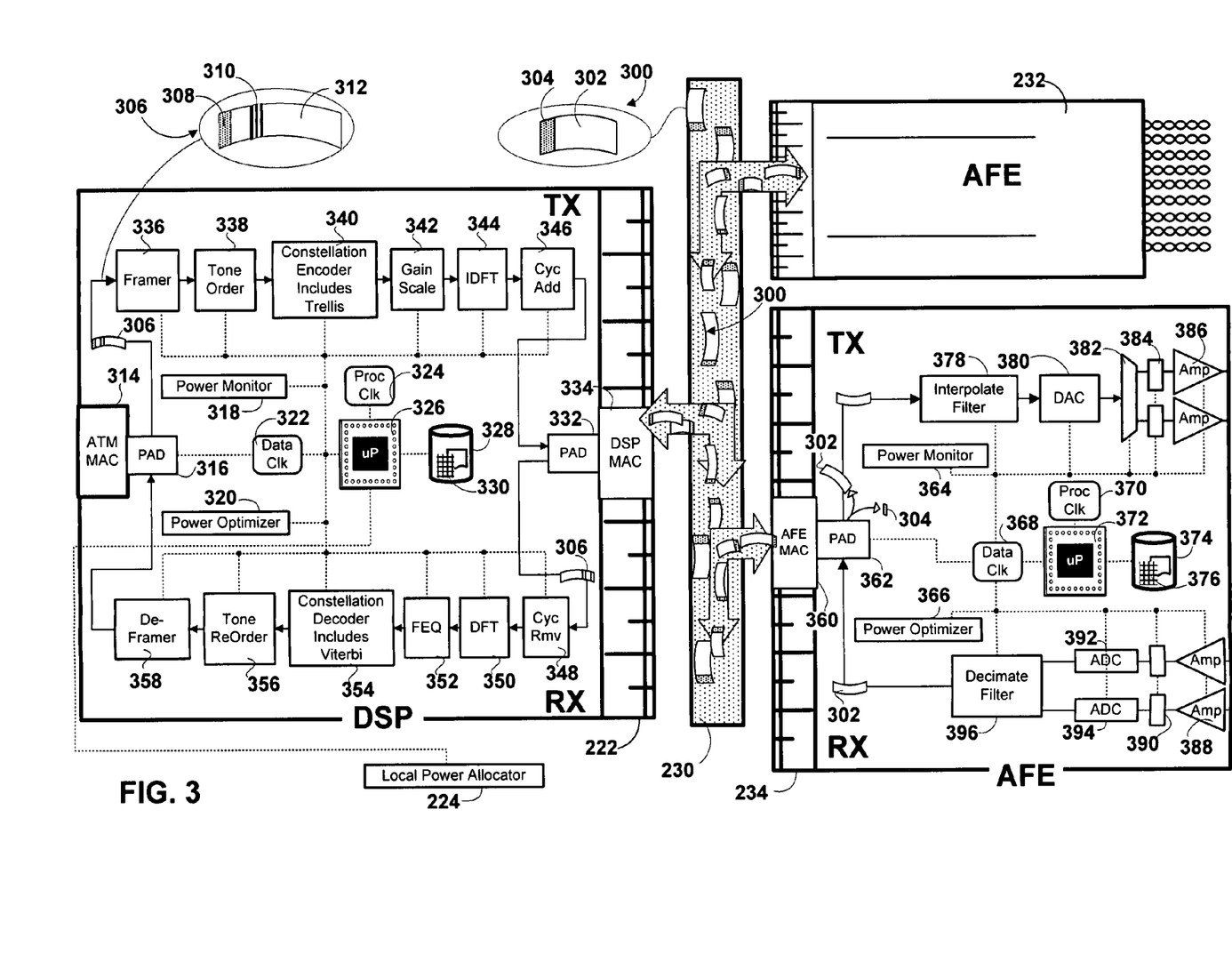
FIG. 3 is a detailed hardware block diagram of an embodiment of a portion of one of the line cards shown in FIG. 2.

FIG. 3 is a detailed hardware block diagram of an embodiment of a portion of one of the line cards shown in FIG. 2 in which multiple analog front end (AFE) chips 232-234 connect with one or more digital signal processing (DSP) chips, e.g. DSP, 222 across bus 230. In an alternate embodiment of the invention each AFE has separate ports for each subscriber line connection which are coupled directly to an associated port of the corresponding DSP, thereby obviating the need for a bus. These digital and analog chips are all mounted on the line card 220 shown in FIG. 2. A single line card may currently support 64 to 128 ports each handling communications of an associated one of the digital subscriber lines. In the embodiment of the line card shown in FIG. 3, packets of raw data are shown being transported between the DSP and AFEs as well as within each DSP and AFE. Packet processing between the DSP and AFE chips involves transfer of bus packets 300. Packet processing within a DSP may involve device packets 306. Packet processing within an AFE may involve raw data packets 302. These will be discussed in the following text. In this embodiment of the invention, a local power allocator 224 is coupled to the DSP and through it to the AFEs to control power allocation for communications over each subscriber line services by the line card. In an alternate embodiment of the invention the global allocator 204 (See FIG. 2) would directly couple to the DSP(s) on each line card and through them to the associated AFEs to control power allocation on a pro rata basis per digital subscriber line.

These modules, AFE and DSP, may be found on a single universal line card, such as line card 220 in FIG. 2. They may alternately be displaced from one another on separate line cards linked by a DSP bus. In still another embodiment they may be found displaced from one another across an ATM network. There may be multiple DSP chipsets on a line card. In an embodiment of the invention the DSP and AFE chipsets may include structures set forth in the figure for handling of multiple line codes and multiple channels.

The DSP chip 222 includes an upstream (receive) and a downstream (transmit) processing path with both discrete and shared modulation and demodulation modules or components. The components are configurable on the fly to process each packet of data in a manner consistent with the characteristics of the corresponding subscriber line over which the packet will be transported, the assigned modulation protocol for that line and the service level assigned to the subscriber. The data rates of various components on the transmit and receive path are governed by one or more data clocks 322. The modules or components may be implemented in hardware, firmware or software without departing from the scope of the claimed invention. In an embodiment of the invention selected ones of the modules are responsive to packet header information and/or control information to vary their processing of each packet to correspond with the X-DSL protocol and line code and channel which corresponds with the packet contents. Data for each of the channels is passed along either path in discrete packets the headers of which identify the corresponding channel and may additionally contain channel specific control instructions for various of the shared and discrete components along either the transmit or receive path.

On the upstream path, upstream packets containing digital data from various of the subscribers is received by the DSP medium access control (MAC) 334 which handles packet transfers to and from the DSP bus. The MAC couples with a packet assembler/disassembler (PAD) 332. For upstream packets, the PAD handles removal of the DSP bus packet header 304 and the packaging of the data 312 into a device packet 306 which includes a device header 308 and a control header 310. The content of these headers is generated by the core processor 326 using information downloaded from the DSLAM controller 202 (See FIG. 2) as well as statistics such as gain tables gathered by the de-framer 358, or embedded operations channel communications from the subscriber side. The processing rate of the core processor is determined by process clock 324. These channel specific and control parameters 330 are stored in memory 328 which is coupled to the core processor. The PAD 332 embeds the required commands generated by the core processor in the header or control portions of the device packet header of the upstream data packets. The upstream packets may collectively include data from multiple channels each implementing various ones of the X-DSL protocols. Thus the header of each device packet identifies the channel corresponding with the data contained therein. Additionally, a control portion of the packet may, in an embodiment of the invention, include specific control instructions for any of the discrete or shared components which make up the upstream or downstream processing paths.

Upstream processing in the DSP begins with the removal of the cyclic prefix/suffix in module 348. Next in the discrete Fourier transform module (DFT) 350 received data from each subscriber line is transformed from the time to the frequency domain. In this embodiment of the invention, the information in the header of the packet is used to maintain channel identity of the data as it is demodulated. The DFT is responsive to the header information in each packet to setup the transform with the appropriate parameters for that channel, e.g. sample size, and to provide channel specific instructions for the demodulation of the data. The demodulated data is passed as a packet to the next component in the upstream path, i.e. the frequency error corrector (FEQ) 352. Next constellation decoding, including Viterbi decoding, takes place in component 354. Then the tones are reordered in the tone reorderer 356 and deframed in the deframer and Reed Solomon decoder 358. This component reads each device packet header and processes the data in it in accordance with the instructions or parameters in its header. The demodulated, decoded and de-framed data is passed to PAD 316. In PAD 316 the device packet header is removed and the demodulated data contained therein is wrapped with an asynchronous transfer mode (ATM) or other network header and passed to the medium access control (MAC) 314 for transmission over the ATM or other network to which the line card is coupled (See FIGS. 1-2).

On the downstream path, downstream packets containing digital data destined for various subscribers is received by the MAC 314 and passed to the PAD 316 where the ATM or other header is removed and the downstream device packet 306 is assembled. Using header content generated by the core processor 326 the PAD assembles data from the ATM or other network into channel specific packets each with their own header 308, data 312 and control 310 portions. The downstream packets are then passed to the Framer and Reed Solomon encoder 336 where they are processed in a manner consistent with the control and header information contained therein. From the framer packets are subject to tone ordering in the tone orderer 338 and to constellation encoding, including trellis encoding, in the constellation encoder 340. Gain scaling is performed in the gain scaler 342. Next downstream packets are passed to the inverse discrete Fourier transform component/module 344 for transformation from the frequency to the time domain. The setup of the IDFT is reconfigured on the fly to match the requirements assigned to each packets corresponding channel or subscriber line. Next, each downstream packet with the modulated data contained therein is then passed to the PAD 332. In the PAD 332 the device packet header and control portions are removed, and a DSP bus header 304 is added to the data 302. This header identifies the specific channel and may additionally identify the sending DSP, the target AFE, the packet length and such other information as may be needed to control the receipt and processing of the packet by the appropriate AFE. The packet is then passed to the MAC 334 for placement on the DSP bus 230 for transmission to the appropriate AFE.

In this embodiment of the invention each DSP includes one or more power monitors 318 to measure overall power consumption of the DSP or discrete power consumption associated with communications over each subscriber line or port. In various embodiments of the invention the power monitor may be implemented thermally, inductively, or resistively. The DSP in this embodiment of the invention also includes a power optimizer 320. The power optimizer is coupled directly or via the core processor 326 to selected configurable components on the transmit and receive path to optimize power consumption for each subscriber line at the assigned data rate. The power optimizer may operate during either or both the training or showtime phase of each communication channel or subscriber line's operation.

FIG. 3 also shows a more detailed view of the processing of upstream and downstream packets within the AFE 234. In the embodiment of the invention shown, device packets are not utilized in the AFE. Instead, channel and protocol specific processing of each packet is implemented using control information for each channel stored in memory at session setup. Each AFE chip 234 includes an upstream (receive) and a downstream (transmit) processing path with both discrete and shared modulation and demodulation modules or components. The components are configurable on the fly to process each packet of data in a manner consistent with the characteristics of the corresponding subscriber line over which the packet will be transported, the assigned modulation protocol for that line and the service level assigned to the subscriber. The data rates of various components on the transmit and receive path are governed by one or more data clocks 368.

Downstream packets from the DSP are pulled off the bus 230 by the corresponding AFE MAC, e.g. MAC 360, on the basis of information contained in the header portion of that packet. Each downstream packet is passed to PAD 362 which removes the header 304 and sends it to the core processor 372. The core processor matches the information in the header with channel control parameters 376 contained in memory 374. These control parameters may have been downloaded to the AFE at session setup. The processing rate of the core processor is determined by process clock 370. The raw data 302 portion of the downstream packet is passed to interpolator and filter 378. The interpolator up-samples the data and low pass filters it to reduce the noise introduced by the DSP. Implementing interpolation in the AFE as opposed to the DSP has the advantage of lowering the bandwidth requirements of the DSP bus 230. From the interpolator data is passed to a digital-to-analog converter (DAC) 380 which processes each channel in accordance with commands received from the core processor 372 using the control parameters downloaded to the control table 376 during channel setup. The analog output of the DAC is passed via analog mux 382 to a corresponding one of sample and hold devices and analog filters 384. Each sample and hold and filter is associated with a corresponding subscriber line. The sampled data may be amplified by line amplifiers 386. The parameters for each of these devices, i.e. filter coefficients, amplifier gain etc. are controlled by the core processor using the above discussed control parameters 376. For example, where successive downstream packets carry downstream channels each of which implements different protocols, e.g. G.Lite, ADSL, and VDSL the sample rate of the analog mux 382 the filter parameters for the corresponding filter and the gain of the corresponding one of analog amplifiers 386 will vary for each packet. This "on the fly" configurability allows a single downstream pipeline to be used for multiple concurrent protocols.

On the upstream path many of the same considerations apply. Individual subscriber lines couple to individual line amplifiers 388 through splitter and hybrids (not shown). Each channel is passed through analog filters and sample and hold modules 390 and dedicated analog-to-digital conversion (ADC) modules 392-394. As discussed above in connection with the downstream/transmit path, each of these components is configured on the fly for each new packet depending on the protocol associated with it. From each ADC fixed amounts of data for each channel, varying depending on the bandwidth of the channel, are processed by the decimator and filter module 396. The amount of data processed for each channel is determined in accordance with the parameters 376 stored in memory 374. Those parameters may be written to that table during the setup phase for each channel.

From the decimator and filter the raw upstream data 302 is passed to PAD 362 during each bus interval. The PAD wraps the raw data in a DSP header 304 with channel ID and other information which allows the receiving DSP(s) to properly process it. The upstream packet is placed on the bus by the MAC 360. A number of protocols may be implemented on the bus 216. In an embodiment of the invention the DSP operates as a bus master governing the pace of upstream and downstream packet transfer and the AFE utilization of the bus.

In this embodiment of the invention each AFE includes one or more power monitors 364 to measure overall power consumption of the DSP or discrete power consumption associated with communications over each subscriber line or port. In various embodiments of the invention the power monitor may be implemented thermally, inductively, or resistively. The DSP in this embodiment of the invention also includes a power optimizer 366. The power optimizer is coupled directly or via the core processor 372 to selected configurable components on the transmit and receive path to optimize power consumption for each subscriber line at the assigned data rate. The power optimizer may operate during either or both the training or showtime phase of each communication channel or subscriber line's operation.

Figure 4A:
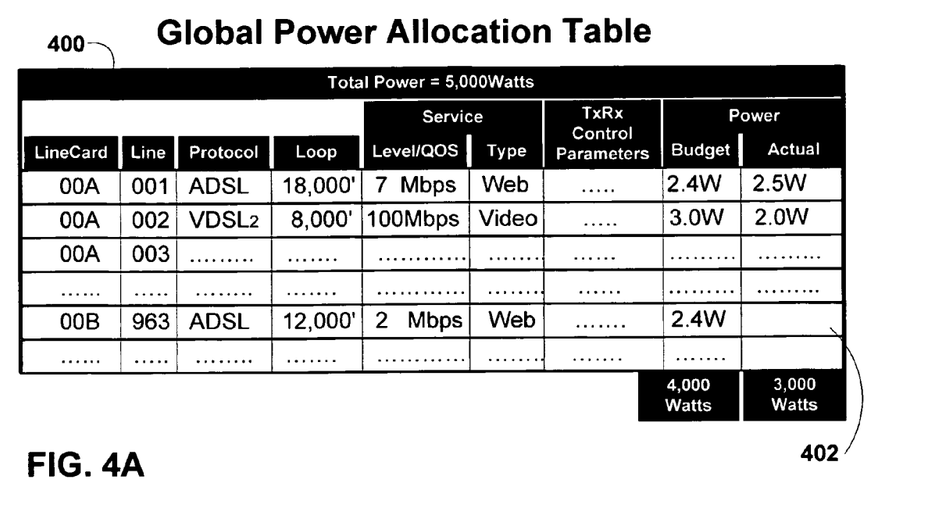
FIGS. 4A-4B show data structures maintained by different embodiments of the global power allocator for all line cards as shown in FIG. 2.
Figure 4B:
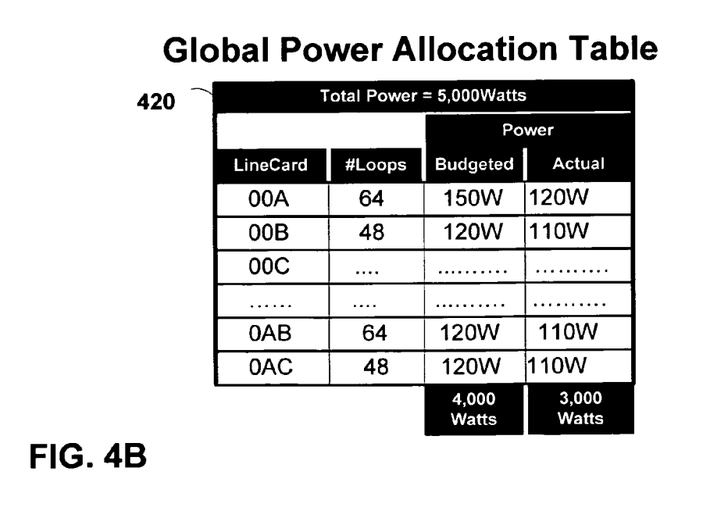

FIGS. 4A-4B show data structures maintained by different embodiments of the global power allocator 204 for all line cards as shown in FIG. 2. The global allocator maintains records for each line card and associated subscriber lines which allow for intelligent power allocation among the subscriber lines. In the embodiment shown in FIG. 4A these records 400 include: minimum service requirements such as service level and quality of service and data type; XDSL protocol and band plan; line characteristics such as loop length line length, available bandwidth, and interference; control and or operational parameters such as sampling rate, data rate, processing rate, power spectral density, codeword size, #of sub-channels or tones, etc; and allocated and actual power consumption for each line The per line breakdown of actual power per line on the type of power monitoring available and may in an embodiment of the invention be based on the incremental change in power requirements as each line is initialized, dropped, or re-initialized. The records are updated through feedback from the local power allocator on each line card and the power monitors, the power optimizers, and the core processor to which it is directly or indirectly coupled. As lines are initialized the corresponding actual power consumption record is updated to reflect the actual power required to drive communications on the corresponding subscriber line. FIG. 4B shows an alternate abbreviated record format 420 maintained by the global power allocator in an alternate embodiment of the invention in which more detailed records are maintained exclusively by the local power allocators on each line card.

Figure 5A:
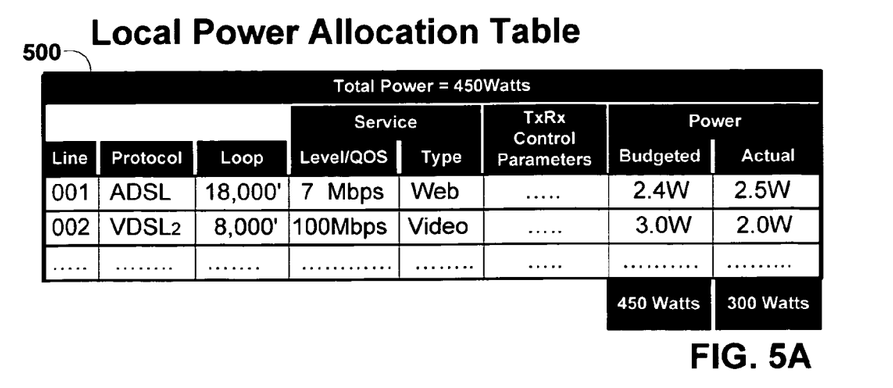
FIG. 5A shows a data structure maintained by an embodiment of the local power allocator of a line card as shown in FIGS. 2-3.

FIG. 5A shows a data structure 500 maintained by an embodiment of the local power allocator, e.g. local power allocator 224 of line card 220 shown in FIGS. 2-3. The records correspond to those discussed above in connection with FIG. 4A. In alternate embodiments of the invention the global power allocator couples directly to the DSP(s) on each line card to control power allocation for each channel and associated subscriber line, thus obviating the need for a local power allocator.

Figure 5B:
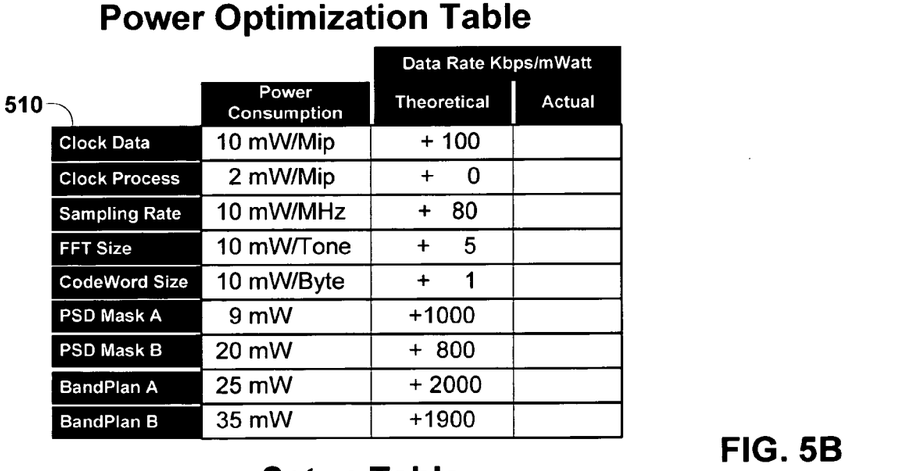
FIGS. 5B-5C show a data structure maintained by an embodiment of power optimizers shown in FIGS. 2-3.
Figure 5C:
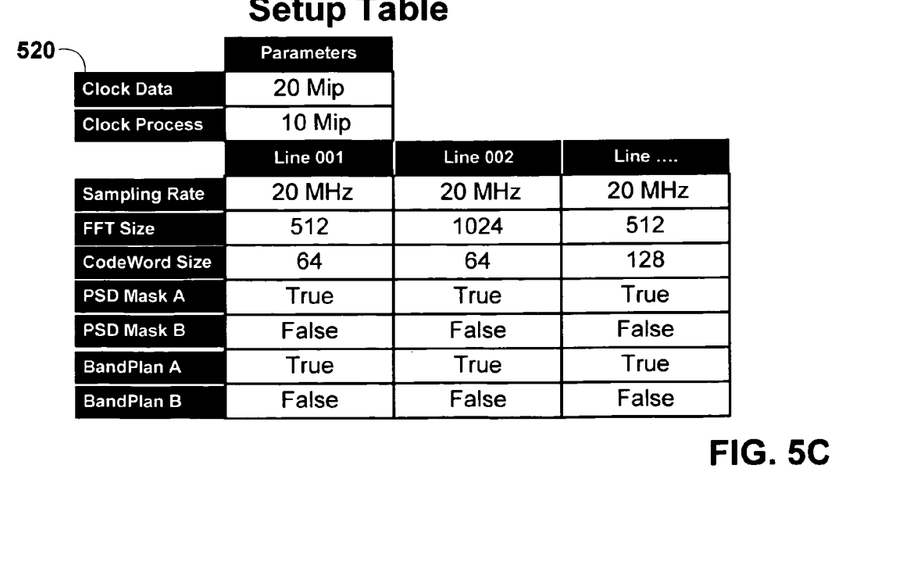

FIGS. 5B-5C show a data structure maintained by an embodiment of power optimizers 320, 366 shown on line card 220 in FIGS. 2-3. Each power optimizer is coupled directly or via the core processor of the associated DSP or AFE to selected configurable components on the transmit and receive path to optimize power consumption for each subscriber line at the assigned data rate. The power optimizer may operate during either or both the training or showtime phase of each communication channel or subscriber line's operation. The power optimizer utilizes records 510 shown in FIG. 5B which correlate power and data rate with the performance parameters of various configurable components in the transmit and receive path. The components shown in records 510 include: data and process clocks, DAC and ADC sampling rates, FFT tones, Reed Solomon codeword size, power spectral density masks and band plans. These correlations may be updated by the power optimizer during operation to increase their accuracy and allow for fine optimizations of power required to maintain an initial data rate assigned to XDSL communications over a given subscriber line. The optimizer maintains a setup table 520 shown in FIG. 5C showing detailed component operational/control parameters for each channel and associated subscriber line. During operation these parameters may be feedback to the local allocator which in turn may update the corresponding records in the global allocator.

Figure 6:
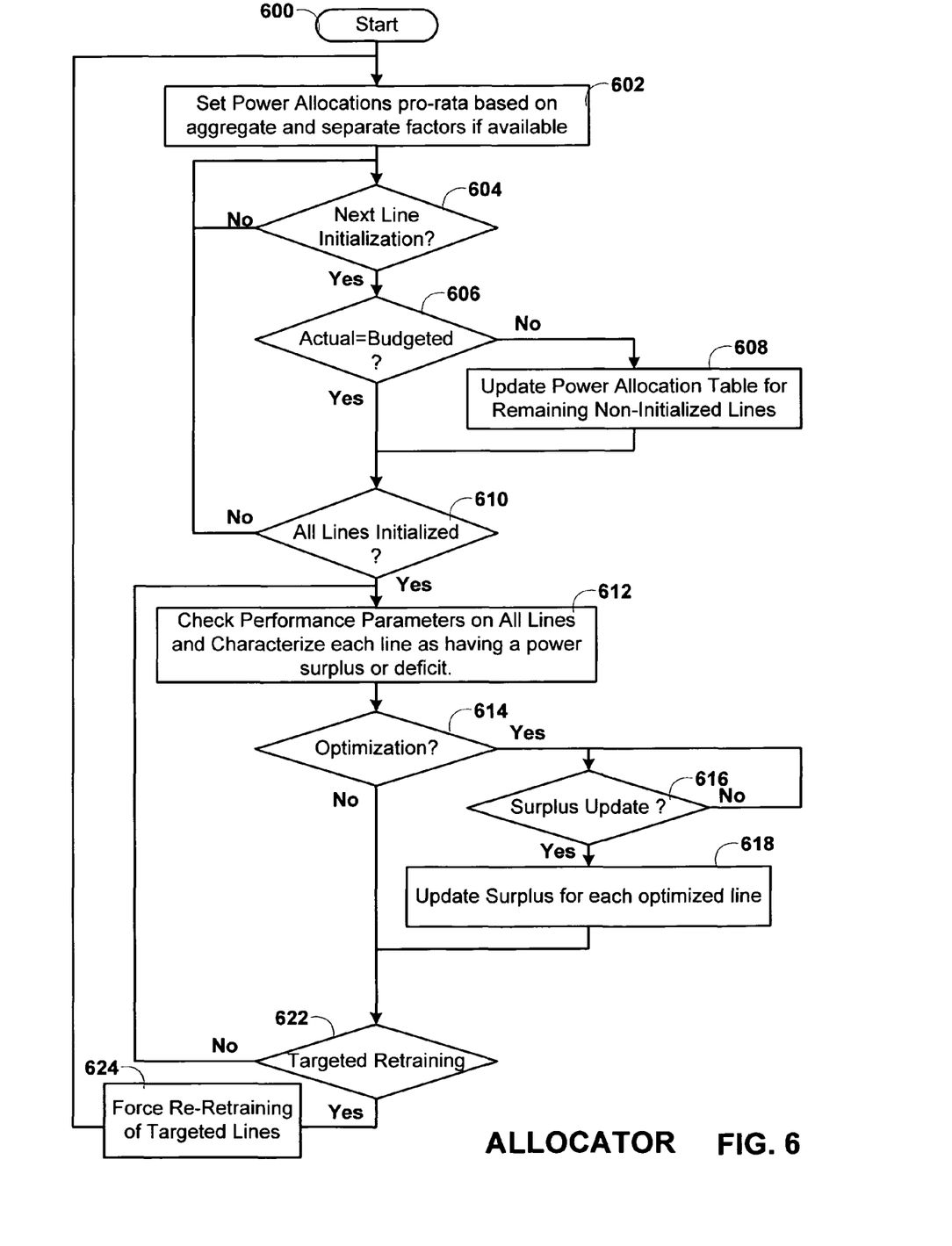
FIG. 6 is a process flow diagram of an embodiment of the processes performed by the global and or local power allocators shown in FIGS. 2-3.

FIG. 6 is a process flow diagram of an embodiment of the processes performed by the global and or local power allocators shown in FIGS. 2-3. Processing begins at startup 600 in which the total power available to each line card of cabinet is specified. Next in process 602 power allocations for each subscriber line are set on a pro-rata basis using aggregate and separate factors for each line to assure that the total power consumed by the associated line card(s) does not exceed an established limit. Aggregate factors include: the number of lines, the number of active lines, the number of inactive lines. Separate factors include: line length, modulation protocol, service level, quality of service, data type, data rate, bandwidth, band plan, # tones, sampling rate, clock rates, codeword sizes etc. These parameters are used to initialize the line card XDSL communications over each subscriber line.

In decision process 604 power allocations are subject to revision as each line is initialized and control is passed to decision process 606. In decision process 606 a determination is made as to whether the actual power consumed for the initialized line is equal to the budgeted power. If it is not, then control passes to process 608 for an update of the corresponding record in the power allocation table and for a pro-rata increase or decrease in the power allocated to remaining non-initialized lines. Control in either case then passes to decision process 610 for a determination as to the initialization of XDSL communications on all subscriber lines. If lines remain to be initialized the control returns to decision process 604. Once all lines are initialized control passes to process 612.

The performance parameters for all initialized lines are checked in process 612. This check assures that the last initialized lines have sufficient power to meet their service requirements and that the first initialized lines are not consuming more power than required. Next in decision process 622 a determination is made as to whether a targeted retraining is warranted. The targeted retraining may be triggered when one or more lines has suboptimal performance brought about by a power deficit, in which event the retraining may also target a line having a power surplus a reduction of power consumption by which on retraining will be used to supply the requisite power. Alternately, the targeted retraining may be triggered when one or more lines has a power surplus above that required to meet the required service level and data rate. If retraining is required control passes to process 624 in which retraining of targeted lines is initiated, after which control returns to process 602 for a re-allocation of power to associated records of the targeted subscriber lines.

Intermediate process 612 and decision process 622 is an optimization decision block 614. The optional decision block is present in embodiments of the invention which include one or more power optimizers in the line card. If there is such a module then control passes to decision process 616, in which feedback from the optimizer is detected. That feedback involves the identification of a channel or subscriber line and a power surplus for same as determined by the power optimizer. In an embodiment of the invention with autonomous power optimizers, the surplus may already have been established by the optimizer by reducing the power consumption of the XDSL communications over the associated subscriber line. In other embodiments of the invention the surplus identified by the optimizer may be prospective only, and may require retraining to take effect. In any event, the appropriate adjustment is made to the associated record in the power allocator and control then passes to decision process 622 for a targeted retraining decision as discussed above.

Figure 7:
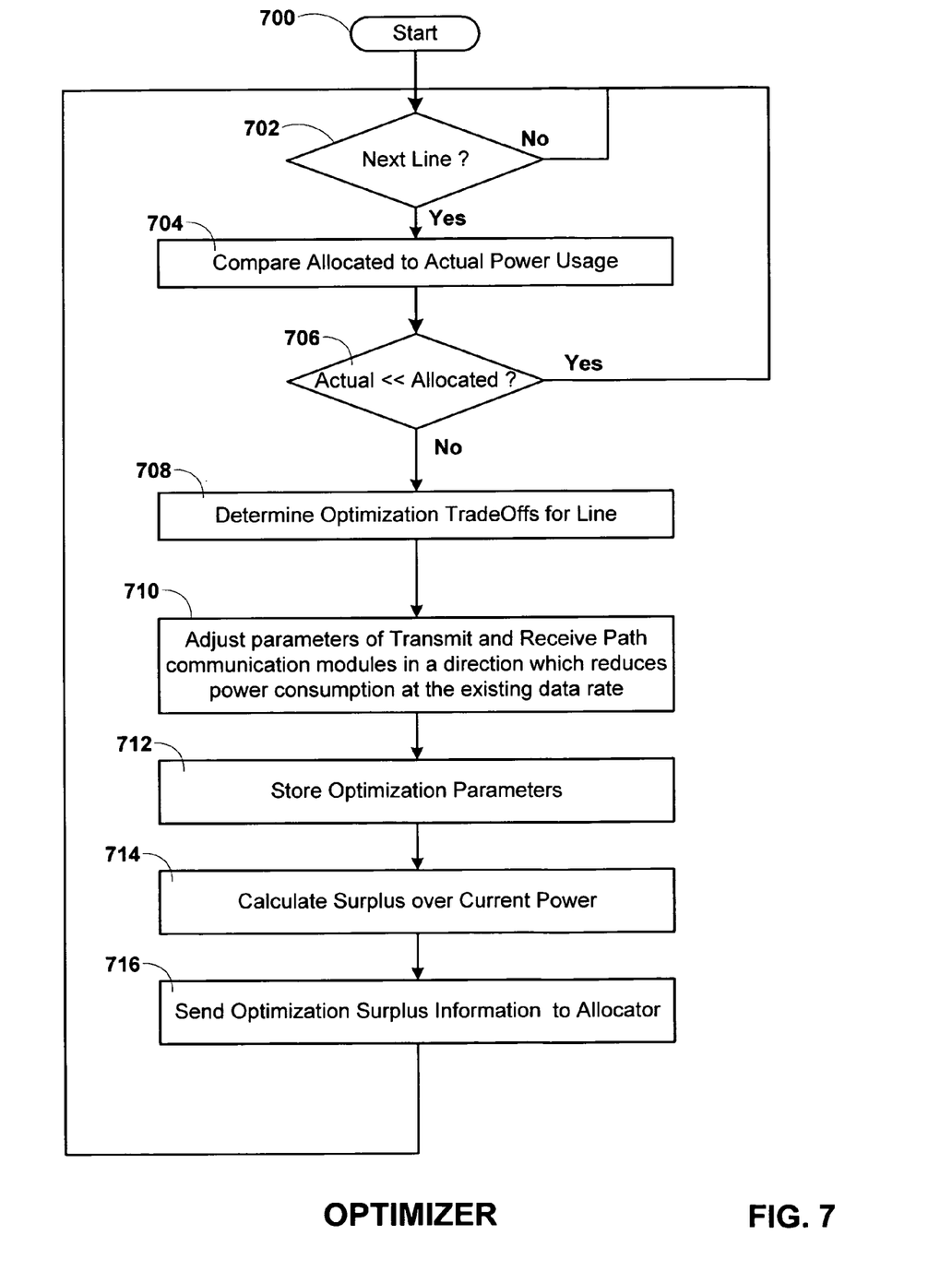
FIG. 7 is a process flow diagram of an embodiment of the processes performed by the power optimizers shown in the line cards of FIGS. 2-3.

FIG. 7 is a process flow diagram of an embodiment of the processes performed by the power optimizers shown in the line cards of FIGS. 2-3. Each power optimizer optimizes power consumption for each subscriber line at the assigned data rate. The power optimizer may operate during either or both the training or showtime phase of each communication channel or subscriber line's operation. The power optimizer correlate power and data rate with the performance parameters of various configurable components in the transmit and receive path the adjustment of which during initialization or showtime reduces power consumption at the assigned data rate.

After startup 700 control passes to decision process 702 in which a determination is made as to the onset of optimization for a next subscriber line. Control passes next to process 704 in which the allocated power usage for that line is compared to the actual power usage as determined by information obtained from the power monitor. If actual power usage is substantially less than allocated then the lines power consumption may be optimal and control returns to decision process for the processing of the next line. Alternately, if actual power is proximate or greater than the allocated power than the line may benefit from power optimization and control passes to process 708. In process 708 the power optimizer analyzes current transmit and receive path component setup parameters versus various alternate power optimization settings gleaned from its power optimization records (See FIG. 5B, reference 510). In an embodiment of the invention in which the power optimizer operates autonomously, it then makes the requisite adjustments to the setup parameters of selected ones of the transmit and receive path components. It then stores the current and prior setup parameters in process 712 and in process 714 determines the actual or prospective power surplus realized thereby. This optimization information is then sent to the power allocator for updating its power allocation records.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A line card configured to couple to a plurality of digital subscriber lines to support multi-tone modulation of communications channels thereon; and the line card comprising;

an allocator for allocating power to the multi-tone modulated communications on each of the plurality of subscriber lines, and for selecting control parameters sufficient to effect communications on each of the plurality of subscriber lines at a power level proximate to an allocated power level therefore; and a plurality of configurable components coupled to one another to form a transmit path and a receive path configured to couple to the plurality of digital subscriber lines and the plurality of configurable components responsive to the control parameters selected by the allocator to initialize multi-tone communications over each of the plurality of subscriber lines at a power level proximate the allocated power level.

2. The line card of claim 1, further comprising:

at least one monitor for monitoring the actual power consumed by the line card; and the allocator further configured for comparing the actual power monitored by the at least one monitor with the allocated power for each of the plurality of subscriber lines and for reducing allocated power to remaining non-initialized ones of the digital subscriber lines if the actual power exceeds the allocated power.

3. The line card of claim 1, further comprising:

an optimizer coupled to the plurality of configurable components and to the allocator and the optimizer configured to adjusting transmit or receive parameters of selected components on the line card in a direction which reduces power consumption required to support an existing data rate on an associated subscriber line below the allocated power level.

4. The line card of claim 1, further comprising:

the allocator further configured to re-initialize communications at a reduced power level over selected ones of the plurality of subscriber lines on the basis of specific communication factors determined during initialization including at least one of: line length, available bandwidth, and interference.

5. The line card of claim 1, further comprising:

an optimizer coupled to the plurality of configurable components and to the allocator and the optimizer configured to incrementally adjusting at least one of clock speed, power spectral density, bandwidth, and number of sub-channels associated with communications on an associated digital subscriber line in a direction which reduces power consumption at a required data rate.

6. The line card of claim 1, further comprising:

an optimizer to project a power surplus resulting from optimizing transmit or receive parameters of selected components on the line card supporting communications on an associated one of the subscriber lines; and the allocator further configured to reinitialize communications on the associated one of the subscriber lines having a power surplus as projected by the optimizer.

7. The line card of claim 1, further comprising:

the allocator further configured to allocate power to each digital subscriber line based on distinct operational parameters of the subscriber line including at least one of line length, service level, quality of service, data rate, bandwidth and band plan.

8. The line card of claim 1, wherein the allocator is configured to select the control parameters by:

determining an aggregate amount of power available; and assigning a respective budget power to each of the plurality of subscriber lines such that the aggregate amount of power is not exceeded, wherein the respective budget power is sufficient for a respective type of communications to be initialized on each of the plurality of subscriber lines.

9. A method for power management of at least one line card configured to support multi-tone communications over digital subscriber lines, and the method comprising:

identifying a number of digital subscriber lines coupled to the at least one line card;

determining a total power available to the at least one line card for communications over the digital subscriber lines identified in the identifying act;

allocating power to the at least one line card based at least on a number of digital subscriber lines coupled thereto and for selecting control parameters sufficient to effect communications on each of the number of subscriber lines at a power level proximate to an allocated power level thereto; and initializing each subscriber line at a power level allocated in the allocating act based on the control parameters.

10. The method for power management of claim 9, further comprising:

monitoring the actual power consumed by the at least one line card; comparing the actual power monitored in the monitoring act with the power allocated in the allocating act; and reducing allocated power to remaining non-initialized digital subscriber lines if the actual power exceeds the allocated power in the comparing act, thereby limiting aggregate power allocation to the total power determined in the determining act.

11. The method for power management of claim 9, further comprising:

adjusting transmit or receive parameters of selected components on the line card in a direction which reduces power consumption required to support an existing data rate on an associated subscriber line.

12. The method for power management of claim 9, further comprising:

characterizing each digital subscriber line initialized in the initializing act in terms of at least one of: line length, available bandwidth, and interference; and re-initializing communications at a reduced power level over selected ones of the subscriber lines based on the characteristics of selected ones of the subscriber lines characterized in the characterizing act.

13. The method for power management of claim 9, further comprising:

incrementally adjusting at least one of clock speed, power spectral density, bandwidth, and number of sub-channels associated with communications on an associated digital subscriber line in a direction which reduces power consumption at a required data rate.

14. The method for power management of claim 9, further comprising:

determining a power surplus resulting from optimizing transmit or receive parameters of selected components on the line card supporting communications on an associated one of the subscriber lines;

reinitializing communications on the associated one of the subscriber lines having a power surplus determined in the second determining act falling above a threshold level.

15. The method for power management of claim 9, wherein the allocating act further comprises:

allocating power to each digital subscriber line based on distinct operational parameters of the subscriber line including at least one of: line length, service level, quality of service, data rate, bandwidth and band plan.

16. A means for power management of at least one line card configured to support multi-tone communications over digital subscriber lines, and the means comprising:

means for identifying a number of digital subscriber lines coupled to the at least one line card;

means for determining a total power available to the at least one line card for communications over the digital subscriber lines identified by the means for identifying;

means for allocating power to the at least one line card based at least on a number of digital subscriber lines coupled thereto and for selecting control parameters sufficient to effect communications on each of the number of subscriber lines at a power level proximate to an allocated power level thereto; and means for initializing each subscriber line at a power level allocated by the means for allocating based on the control parameters.

17. The means for power management of claim 16, further comprising:

means for monitoring the actual power consumed by the at least one line card;

means for comparing the actual power monitored by the means for monitoring with the power allocated by the means for allocating; and means for reducing allocated power to remaining non-initialized digital subscriber lines if the actual power exceeds the allocated power in the means for comparing, thereby limiting aggregate power allocation to the total power determined by the means for determining.

18. The means for power management of claim 16, further comprising:

means for adjusting transmit or receive parameters of selected components on the line card in a direction which reduces power consumption required to support an existing data rate on an associated subscriber line.

19. The means for power management of claim 16, further comprising:

means for characterizing each digital subscriber line initialized in the initializing act in terms of at least one of: line length, available bandwidth, and interference; and means for re-initializing communications at a reduced power level over selected ones of the subscriber lines based on the characteristics of selected ones of the subscriber lines characterized by the means for characterizing.

20. The means for power management of claim 16, further comprising:

means for incrementally adjusting at least one of clock speed, power spectral density, bandwidth, and number of sub-channels associated with communications on an associated digital subscriber line in a direction which reduces power consumption at a required data rate.

21. The means for power management of claim 16, further comprising:

means for determining a power surplus resulting from optimizing transmit or receive parameters of selected components on the line card supporting communications on an associated one of the subscriber lines;

means for reinitializing communications on the associated one of the subscriber lines having a power surplus determined by the second means for determining falling above a threshold level.

22. The means for power management of claim 16, wherein the means for allocating further comprises:

means for allocating power to each digital subscriber line based on distinct operational parameters of the subscriber line including at least one of: line length, service level, quality of service, data rate, bandwidth and band plan.

23. A line card power management system for line cards configured to couple to digital subscriber lines to support multi-tone modulation of communications channels thereon; and the line card power management system comprising:

an allocator for allocating power to the multi-tone modulated communications of the digital subscriber lines, and for selecting control parameters sufficient to effect communications on each of the digital subscriber lines at a power level proximate to an allocated power level therefore; and at least one line card coupled to the allocator and including;

a plurality of configurable components coupled to one another to form a transmit path and a receive path configured to couple to associated ones of the digital subscriber lines and the plurality of configurable components responsive to the control parameters selected by the allocator to initialize multi-tone communications over each of the associated ones of digital subscriber lines at a power level proximate the allocated power level.

24. The line card power management system of claim 23, wherein the at least one line card further comprises:

at least one monitor for monitoring the actual power consumed by the at least one line card; and the allocator further configured for comparing the actual power monitored by the at least one monitor with the allocated power for each of the associated ones of the digital subscriber lines and for reducing allocated power to remaining non-initialized ones of the digital subscriber lines if the actual power exceeds the allocated power.

25. The line card power management system of claim 23, wherein the at least one line card further comprises:

an optimizer coupled to the plurality of configurable components and to the allocator and the optimizer configured to adjusting transmit or receive parameters of selected components on the at least one line card in a direction which reduces power consumption required to support an existing data rate on an associated one of the digital subscriber lines below the allocated power level.

26. The line card power management system of claim 23, wherein the at least one line card further comprises:

the allocator further configured to re-initialize communications at a reduced power level over selected ones of the associated digital subscriber lines on the basis of specific communication factors determined during initialization including at least one of: line length, available bandwidth, and interference.

27. The line card power management system of claim 23, wherein the at least one line card further comprises:

an optimizer coupled to the plurality of configurable components and to the allocator and the optimizer configured to incrementally adjusting at least one of clock speed, power spectral density, bandwidth, and number of sub-channels associated with communications on an associated one of the digital subscriber lines in a direction which reduces power consumption at a required data rate.

28. The line card power management system of claim 23, wherein the at least one line card further comprises:

an optimizer to project a power surplus resulting from optimizing transmit or receive parameters of selected components on the at least one line card supporting communications on an associated one of the digital subscriber lines; and the allocator further configured to reinitialize communications on the associated one of the digital subscriber lines having a power surplus as projected by the optimizer.

29. The line card power management system of claim 23, further comprising:

the allocator further configured to allocate power to each digital subscriber line based on distinct operational parameters of the subscriber line including at least one of: line length, service level, quality of service, data rate, bandwidth and band plan.

* * * * *

UNITED STATES PATENT AND TRADEMARK OFFICE
CERTIFICATE OF CORRECTION

PATENT NO. : 8,345,859 B2
APPLICATION NO. : 12/009196
DATED : January 1, 2013
INVENTOR(S) : Heidari et al.

It is certified that error appears in the above-identified patent and that said Letters Patent is hereby corrected as shown below:

In the Specifications:

In Column 1, Line 42, delete "thereto." and insert -- therefore. --, therefor.

In Column 2, Line 33, delete "1." and insert -- 1; --, therefor.

In Column 4, Line 45, delete "DSP," and insert -- DSP --, therefor.

In the Claims:

In Column 10, Line 65, in Claim 1, delete "comprising;" and insert -- comprising: --, therefor.

In Column 11, Line 66, in Claim 7, delete "of line" and insert -- of: line --, therefor.

In Column 14, Line 32, in Claim 23, delete "including;" and insert -- including: --, therefor.

Signed and Sealed this
Third Day of September, 2013

Teresa Stanek Rea
*Acting Director of the United States Patent and Trademark Office*